United States Patent
Yamamoto et al.

(10) Patent No.: US 7,423,867 B2
(45) Date of Patent: Sep. 9, 2008

(54) PORTABLE ELECTRONIC KEY

(75) Inventors: Takao Yamamoto, Saitama (JP);
Tomohiko Yashiro, Saitama (JP);
Masaki Yamazaki, Saitama (JP);
Takeshi Konno, Saitama (JP); Sho Yamamoto, Saitama (JP); Yusuke Funayose, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 393 days.

(21) Appl. No.: 11/355,066

(22) Filed: Feb. 16, 2006

(65) Prior Publication Data

US 2006/0186990 A1    Aug. 24, 2006

(30) Foreign Application Priority Data

Feb. 18, 2005  (JP) .............................. 2005-042212

(51) Int. Cl.
*H05K 5/00*  (2006.01)
(52) U.S. Cl. ........................ 361/684; 340/502; 345/168; 84/720

(58) Field of Classification Search ........................ 701/1, 701/200, 51; 428/195.1, 403, 355 CN; 84/719, 84/745, 720, 433; 340/51, 5.61, 502; 345/173, 345/168–170; 361/679–687, 724–727
See application file for complete search history.

(56) References Cited

U.S. PATENT DOCUMENTS

| | | | | |
|---|---|---|---|---|
| 4,436,993 A | * | 3/1984 | Flies | .......................... 235/382 |
| 2004/0027236 A1 | * | 2/2004 | Zhai | ........................... 340/5.6 |
| 2006/0238296 A1 | * | 10/2006 | Konno | ........................ 340/5.61 |

FOREIGN PATENT DOCUMENTS

| | | |
|---|---|---|
| JP | 2004-114860 A | 4/2004 |
| JP | 2004-276760 A | 10/2004 |

* cited by examiner

*Primary Examiner*—Hung V Duong
(74) *Attorney, Agent, or Firm*—Birch, Stewart, Kolasch & Birch, LLP

(57) ABSTRACT

A portable electronic key easily findable even if dropped into water. The portable electronic key includes an upper cover and a lower cover, a hermetically sealed space is formed, in which electrical equipment such as a board, a battery, and an antenna are arranged. The upper cover and the lower cover are formed of foam resin, and a grain pattern is given to surfaces thereof. A specific gravity of the entire electronic key is set at 1 or less, thus enabling the portable electronic key to float on the surface of the water.

20 Claims, 7 Drawing Sheets

PORTABLE ELECTRONIC KEY

CROSS-REFERENCE TO RELATED APPLICATION

The present application claims priority under 35 U.S.C. §119 to Japanese Patent Application No. 2005-042212, filed Feb. 18, 2005, the entire contents of which are hereby incorporated by reference.

BACKGROUND OF THE INVENTION

1. Field of the Invention

The present invention relates to a portable electronic key to be used, while being carried by a user, in order to start an engine by making wireless communication with a control device mounted in a vehicle and verifying an ID.

2. Description of Background Art

Japanese Patent Laid-open No. 2004-276760 and Japanese Patent Laid-open No. 2004-114860, for example, describe electronic key systems using wireless communication between an electronic key carried by a user and a control device mounted in an actual vehicle, in order to verify an ID and start an engine based on an operation request made by an authorized user.

Japanese Patent Laid-open No. 2004-276760 relates to an anti-theft device for a vehicle or the like. In particular, a configuration is disclosed, which is capable of simply permitting or prohibiting an operation of an engine at a place remote from the vehicle or the like without using a key, in which the key and a key cylinder are removed. In a technical concept of Japanese Patent Laid-open No. 2004-276760, specifically, a portable transmitter (an electronic key) is used in order to simply permit or prohibit the operation of the engine. The portable transmitter is composed of a battery serving as a power supply, and an unlock button which is operated by a driver and transmits an ID code to the vehicle, for example. The unlock button releases a locked state of a vehicle operation instrument such as a steering wheel. A lock button is operated by the driver and transmits, to the vehicle, an ID code for prohibiting the operation of the engine. A remote control unit shapes a waveform of a transmission signal from the unlock button or the lock button and then converts the transmission signal into a signal corresponding to the ID code, and a transmission circuit which transmits, to the vehicle, the signal converted by the remote control unit.

Japanese Patent Laid-open No. 2004-114860 relates to an electronic key system for a vehicle, and discloses a technical concept enabling a warning to be outputted when a user drops an electronic key while the vehicle is stopping and running, thereby attempting to minimize a probability of a loss of the electronic key, which is caused because the user has dropped the electronic key.

In particular, a portable transceiver (the electronic key) of Japanese Patent Laid-open No. 2004-114860 has a card shape as an outline thereof, and includes an IC chip built therein. Specifically, as shown in FIG. 7, a battery 1, a power supply circuit 2, a CPU 3, a receiving circuit 4, and a transmission circuit 5 are built in an inside of the portable transceiver. In this case, the power supply circuit 2 supplies power from the battery 1 to the receiving circuit 4, the transmission circuit 5, and the CPU 3. A signal is transmitted/received to/from a control circuit (not shown). In such a way, a steering wheel is locked and unlocked, an engine is started and stopped, a warning lamp is turned on and off, and so on. With regard to details of the electronic key and the control circuit, specific configurations, functions, and effects thereof are disclosed in Japanese Patent Laid-open No. 2004-114860.

As described above, it is premised that the electronic key is carried. Moreover, in principle, no limitations are imposed on a region where the electronic key is used. Hence, there is a case where the electronic key is used in waterskiing, a pleasure boat, and the like. In this case, there is a possibility that the electronic key is dropped and lost in water and snow owing to mishandling thereof by the user. Moreover, a case body of the conventional electronic key is composed of synthetic resin or the like. Accordingly, when an operator of the pleasure boat or the like suspends the electronic key on the naked skin, the operator sometimes feels uncomfortable since the case itself is hard. This is because the hard case directly abuts on the naked skin.

The present invention has been made in consideration of problems as described above. It is an object of the present invention to provide a portable electronic key, of which location is easily recognizable, for example, even if the electronic key concerned sinks in water owing to some causes, and which does not give a feeling of discomfort to a user even if abutting on the naked skin.

SUMMARY AND OBJECTS OF THE INVENTION

In order to solve the above-described problems, the present invention is a portable electronic key, including: a case body; and an electrical unit having a receiving circuit, a transmission circuit, a switch, and the like, which are housed in an inside of the case body, characterized in that a specific gravity of the case body and the electrical unit is 1 or less as a whole.

As described above, the specific gravity of a set of the case body, the electrical unit, and the like is 1 or less. Accordingly, the portable electronic key is easily floatable on a water surface, even if dropped into the water. Hence, it is possible to visually recognize and retrieve the portable electronic key in a floated state on the water surface, and therefore, and an operator can avoid a loss of the electronic key.

Here, if the case body is formed of foam resin, the specific gravity of the portable electronic key can be easily set at 1 or less. In addition, hardness of the foam resin is low in general, and even if being brought into direct contact with the skin, the foam resin does not cause the feeling of discomfort and causes less trouble in operating the pleasure boat and the like, or playing therewith. Moreover, an air layer (an air chamber) may be provided in the inside of the case body. Also in such a way, the specific gravity of the portable electronic key can be set at 1 or less as a whole.

Moreover, a float body may be filled in the inside of the case body. Specifically, also by filling one having flotation, such as the foam resin and a sponge, the specific gravity of the portable electronic key can be suppressed to 1 or less as a whole. In such a way, it is possible to easily guide the portable electronic key, which is going to sink in water, out on the water surface by flotation thereof, and the operator can avoid the loss thereof.

Furthermore, the portable electronic key is used on a boat or ship. In such a way, even if the portable electronic key is dropped from the boat into water, it is possible to visually recognize and retrieve the portable electronic key surely and rapidly. Accordingly, the operator can avoid the loss of the portable electronic key.

According to the present invention, the portable electronic key is configured in order that the specific gravity of the entirety thereof can be 1 or less. Accordingly, the portable electronic key floats on the water surface even if going to sink in water, and accordingly, an effect that it is made possible to avoid the loss thereof is obtained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
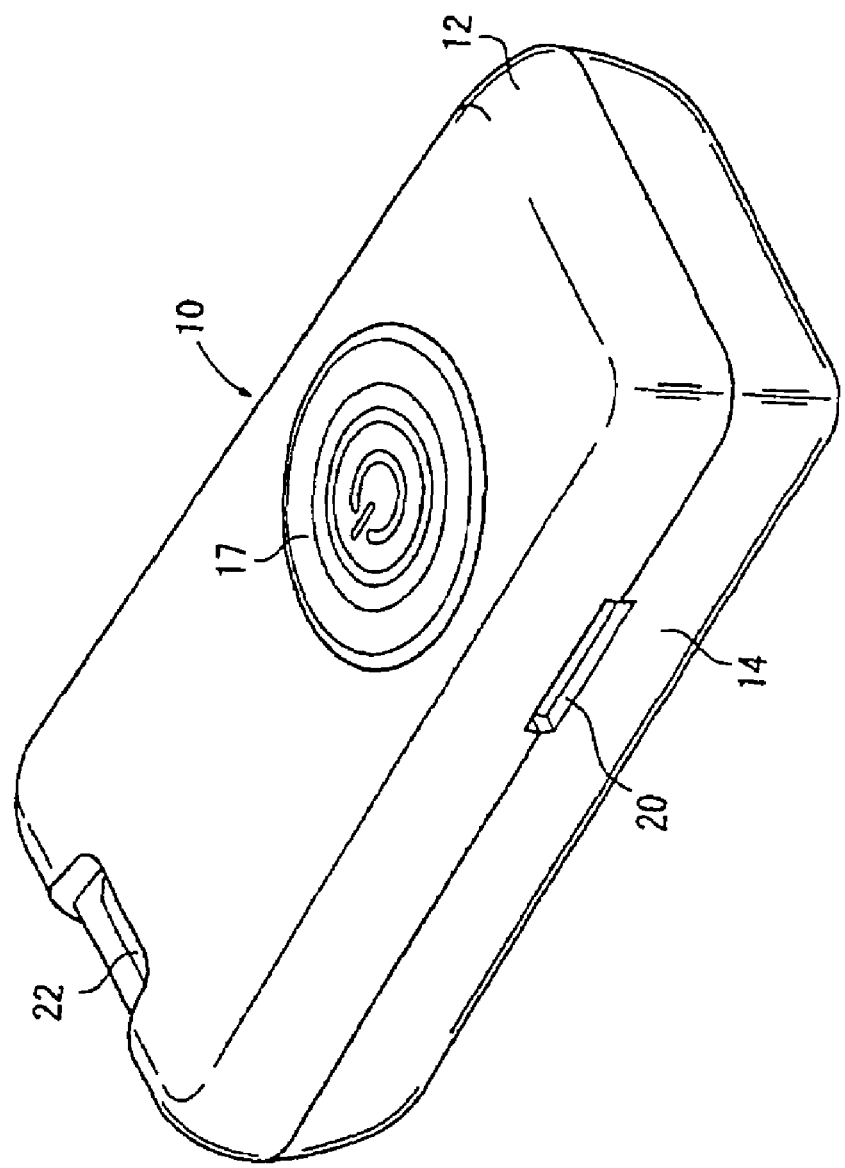
FIG. 1 is a perspective view of an electronic key according to a first embodiment of the present invention.

FIG. 1 illustrates an electronic key 10 according to a first embodiment of the present invention. The electronic key 10 includes an upper cover 12, and a lower cover 14. Preferably, the upper cover 12 and the lower cover 14 are formed of foam resin such as urethane. On an upper surface of the upper cover 12, a pressed part 17 of a switching button 16 for controlling ON/OFF of the electronic key 10 is provided. Meanwhile, on a lower surface of the lower cover 14, seven recessed portions 18 with the same diameter are formed. The recessed portions 18 also function as non-slips when the electronic key 10 is held in the hand of an operator. Note that, when a grain pattern is given to the surfaces of the upper cover 12 and the lower cover 14, which are formed of the foam resin, a far more non-slip effect is obtained.

Figure 2:
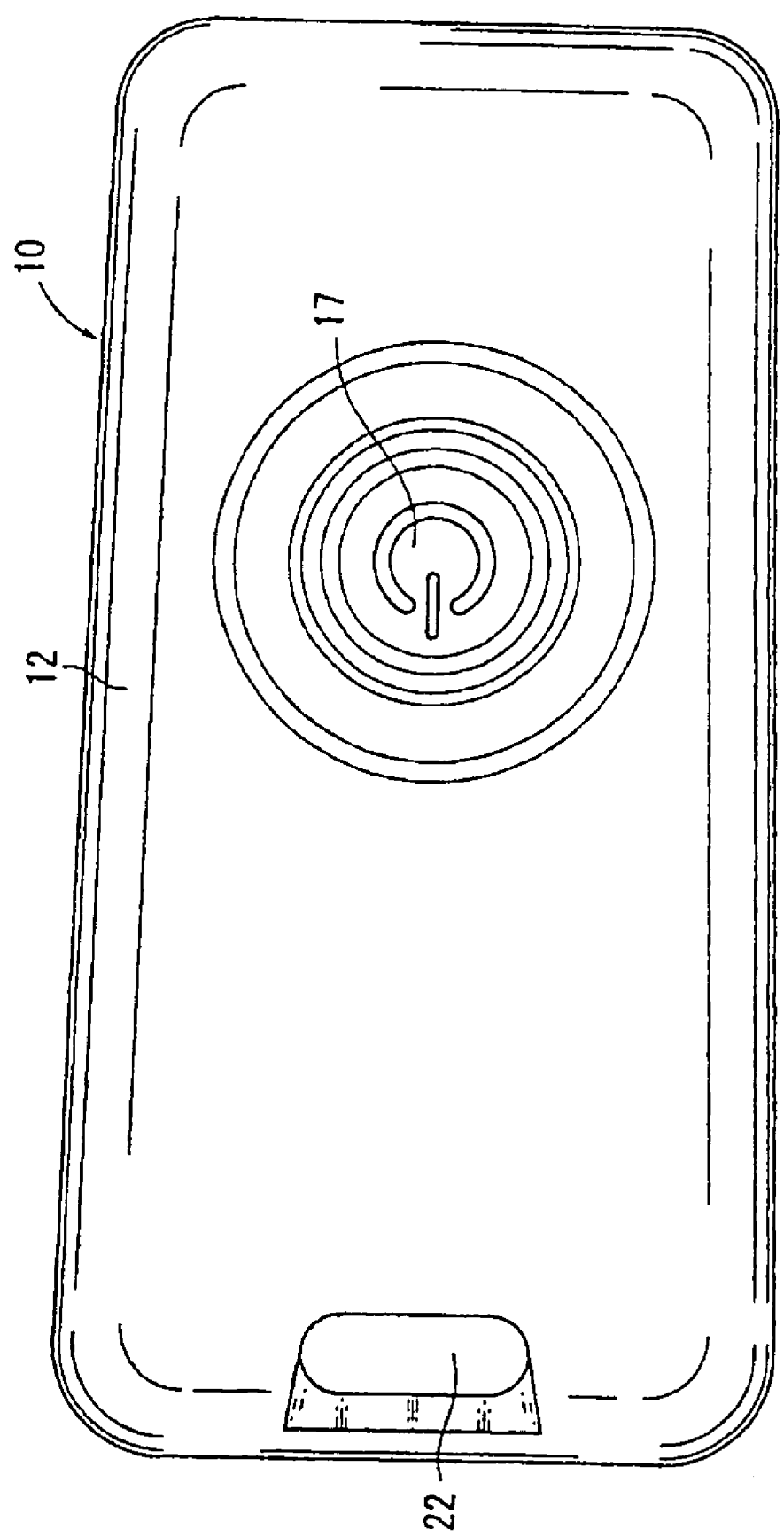
FIG. 2 is a plan view of the electronic key shown in FIG. 1.
Figure 3:
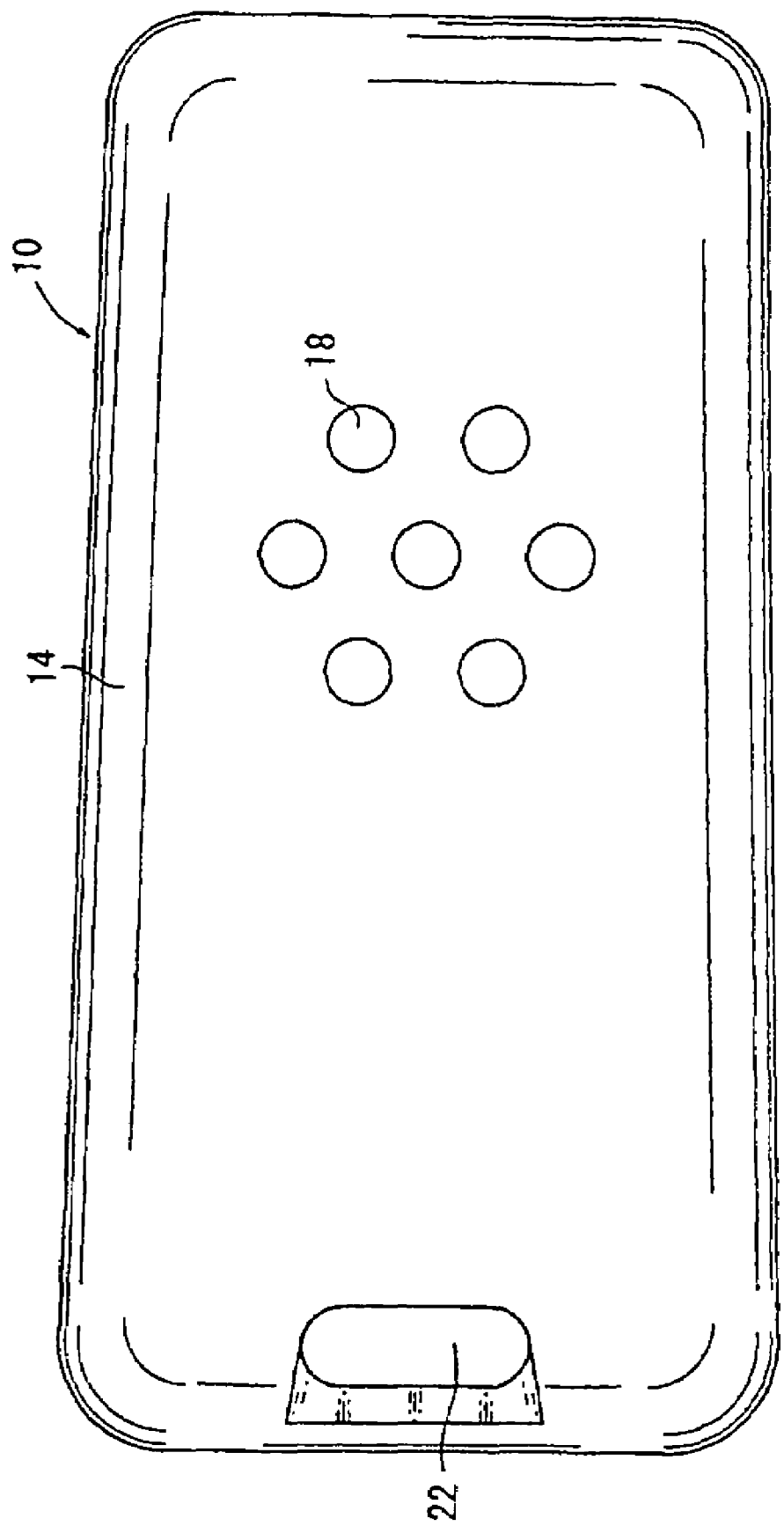
FIG. 3 is a bottom view of the electronic key shown in FIG. 1.

On a boundary site between the upper cover 12 and the lower cover 14, a groove 20 which fits a peripheral edge portion of a coin (not shown) thereinto is formed. The groove 20 is formed for separating the upper cover 12 and the lower cover 14 from each other by twisting the coin. Note that, in FIGS. 1 to 3, reference numeral 22 denotes a through hole formed by both of the upper cover 12 and the lower cover 14. For example, by inserting a metal-made or synthetic resin-made chain, string, or the like through the through hole 22, the operator can suspend the electronic key 10 from the neck, or wind the chain or string of the electronic key 10 around the arm or the leg.

Next, a description will be made of an inside of the electronic key 10 configured as described above while referring to FIG. 4.

Figure 4:
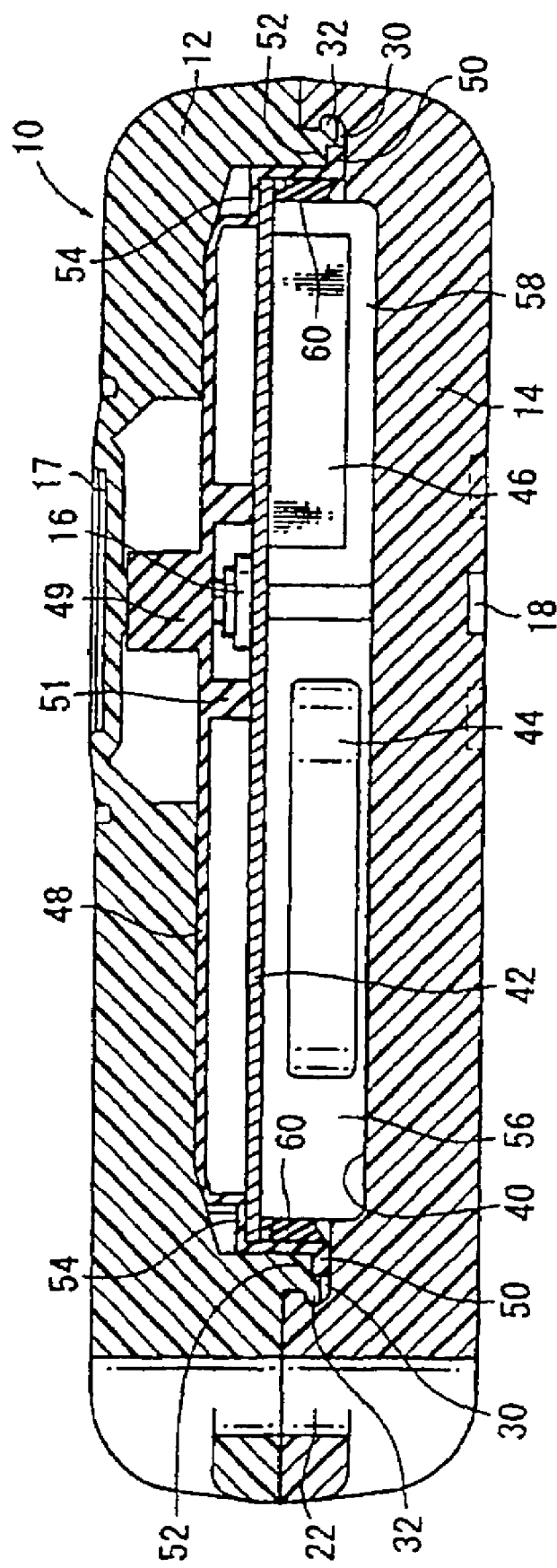
FIG. 4 is a longitudinal cross-sectional view of the electronic key shown in FIG. 1.

As shown in FIG. 4, in the lower cover 14, recessed portions 30 are formed over an entire periphery of an opening portion thereof. Claw portions 32, which are provided on a lower portion of the upper cover 12 while going around a periphery thereof, are fitted to the recessed portions 30, and the upper cover 12 and the lower cover 14 are thus united together. Preferably, the electronic key 10 is configured so as to be as fluid-tight as possible. In such a way, the upper cover 12 and the lower cover 14 are thus united together, and a space, that is, a chamber 40 is thus formed in the inside of the electronic key 10.

In an inside of the chamber 40, a board 42 is disposed, in which a power supply circuit, a receiving circuit, a transmission circuit, a CPU, and the like are mounted. On the board 42, a battery 44 and an antenna 46 are provided so as to be electrically connected thereto. A substantial entirety of the board 42 is covered with a seal member 48 housed in the upper cover 12. The seal member 48 includes a protruding portion 49 protruding upward on an upper surface thereof, and a circular ring portion 51 protruding downward. In an inner space of the circular ring portion 51, the button 16 attached to the board 42 is disposed.

The protruding portion 49 is located above the button 16 and immediately under the pressed spot 17. Hence, if the pressed spot 17 corresponding to the protruding portion 49 of the upper cover 12 is pressed, such electric circuits (not shown) formed on the board 42 can be controlled to be ON/OFF by the button 16. The upper cover 12 includes end edge portions 50 oriented to the recessed portions 30 of the lower cover 14. The end edge portions 50 are pressed so as to be oriented to the lower cover 14 by a step portion 52 formed on the upper cover 12, and a sealing effect is thus achieved. An upper edge portion of the seal member 48 beyond the step-difference portion 54 abuts on an inner wall portion of the upper cover 12, which defines the chamber 40.

In this case, in this embodiment, a battery holder 56 which encloses and holds the battery 44 is provided under the board 42, and an antennal holder 58 which encloses and holds the antenna 46 is provided thereunder. The battery holder 56 and the antenna holder 58 contact lower surfaces thereof to a wall surface of the lower cover 14, which forms the chamber 40, press the battery 44, the antenna 46, and eventually the board 42 to the seal member 48 side, and hold them integrally and firmly. An auxiliary seal member 60 is in pressure contact with the battery holder 56 and the antenna holder 58.

According to the above-described embodiment, a specific gravity of the electronic key 10 is set at 1 or less as a whole, including the upper cover 12, the lower cover 14, the board 42, the battery 44, the antenna 46, the battery holder 56, the antennal holder 58, the seal member 48, and the like. Accordingly, the electronic key 10 easily floats on a water surface even when dropped into water. Therefore, an operator can avoid a loss of the electronic key 10 in water. As described above, the electronic key 10 is suitable in the case of being used in a boat (for example, a water ski and a pleasure boat) moving on water.

In addition, the grain pattern is given to the surfaces of the upper cover 12 and the lower cover 14. Accordingly, even if the electronic key 10 abuts on the naked skin of the operator, a feeling of discomfort does not occur owing to an effect of the grain pattern combined with property of the foam resin material.

Figure 5:
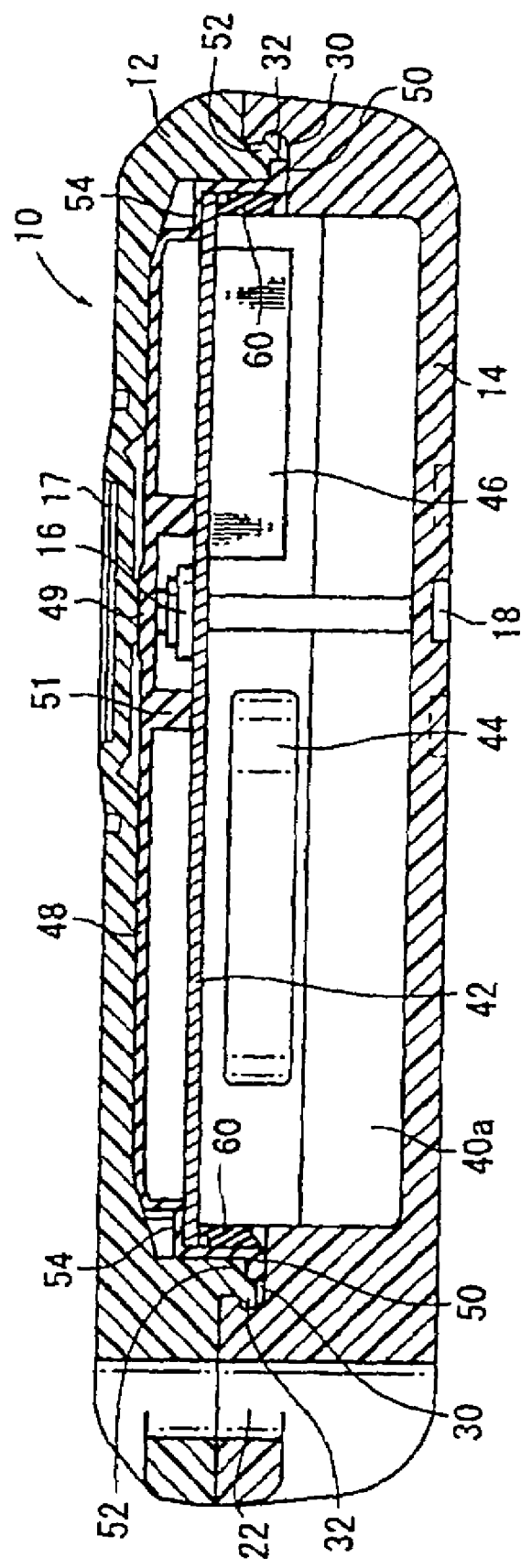
FIG. 5 is a longitudinal cross-sectional view of an electronic key according to a second embodiment of the present invention.

A second embodiment of the electronic key 10 according to the present invention is shown in FIG. 5, in which the same reference numerals are assigned to the same constituents as those of the electronic key 10 in FIGS. 1 to 4, and a detailed description thereof is omitted.

In this second embodiment, in particular, the lower cover 14 is formed to be large, and the chamber 40 is made into a chamber 40*a* (a space) larger than that of the first embodiment. A fluid-tight structure is employed for the upper cover 12 and the lower cover 14, and in addition, the chamber 40*a* with a relatively large capacity is formed, and the specific gravity of the electronic key 10 can be thus set at 1 or less as a whole. In such a way, the same effect as that of the first embodiment is obtained.

Figure 6:
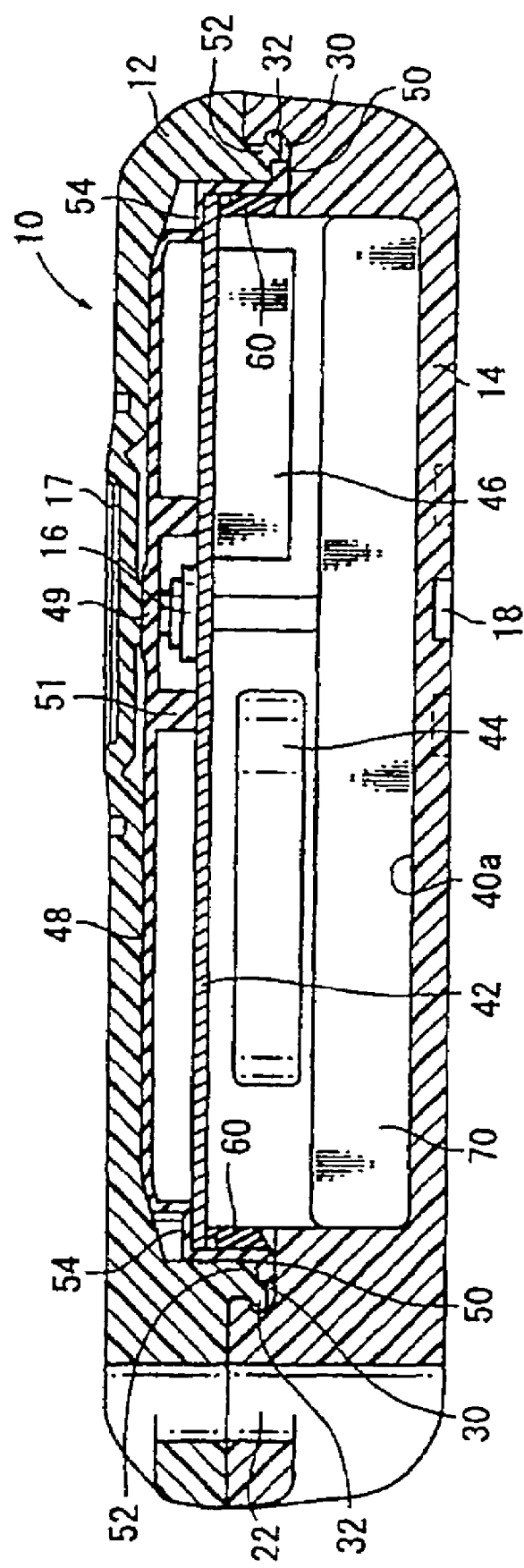
FIG. 6 is a longitudinal cross-sectional view of an electronic key according to a third embodiment of the present invention.
Figure 7:
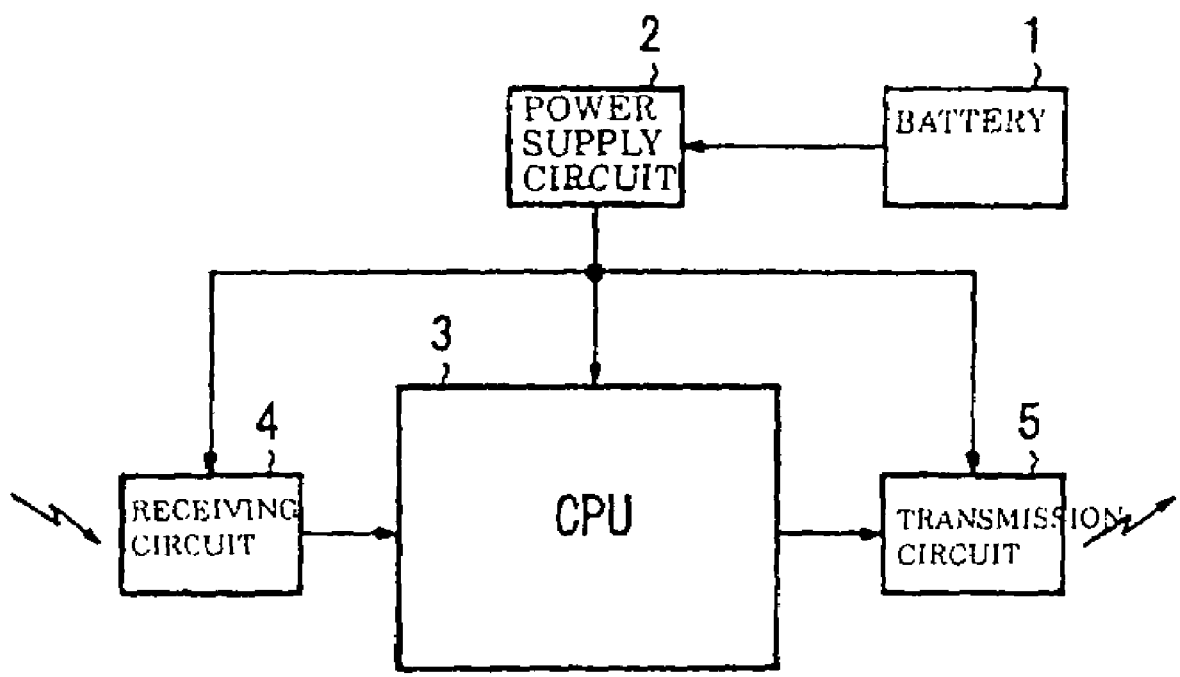
FIG. 7 is a block diagram of an electronic key according to a conventional technology.

A third embodiment of the electronic key 10 according to the present invention is shown in FIG. 6. In this embodiment according to FIG. 6, a float body 70 formed of the foam resin, a sponge, and the like is provided in the chamber 40*a* shown in the second embodiment. If the float body 70 is filled in the chamber 40*a*, and the specific gravity of the electronic key 10 is set at 1 or less as a whole, even if the electronic key 10 has sunk in water, an effect of surely floating the electronic key 10 on the water surface is obtained.

In the configurations as described above, the specific gravity of the electronic key is 1 or more as a whole. Accordingly, for example, even if the electronic key 10 concerned is dropped in water owing to reception of some impact or to carelessness, the electronic key 10 can be easily floated on the water surface by flotation thereof. In this case, since the sufficient fluid-tight structure is employed for the electronic key 10, no disadvantage occurs in electronic equipment such as the board, which is provided in the electronic key 10. Hence, the electronic key 10 can be used again.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable electronic key, comprising:
a case body; and
an electrical unit including a receiving circuit, a transmission circuit, and a switch, which are housed in an inside of the case body,
wherein a specific gravity of the case body and the electrical unit is 1 or less as a whole.

2. The portable electronic key according to claim 1, wherein the case body is formed of foam resin.

3. The portable electronic key according to claim 1, wherein an air chamber is provided in the inside of the case body.

4. The portable electronic key according to claim 2, wherein an air chamber is provided in the inside of the case body.

5. The portable electronic key according to claim 1, wherein a float body is filled in the inside of the case body.

6. The portable electronic key according to claim 2, wherein a float body is filled in the inside of the case body.

7. The portable electronic key according to claim 1, wherein the portable electronic key is used in a ship.

8. The portable electronic key according to claim 1, further comprising recessed portions on a lower surface of the case body.

9. The portable electronic key according to claim 8, further comprising a pressed part on an upper surface of the case body, opposite the recessed portions.

10. The portable electronic key according to claim 1, wherein the case body is waterproof.

11. A portable electronic key, comprising:
a waterproof case body including an upper cover and a lower cover; and
an electrical unit including a receiving circuit, a transmission circuit, and a switch, which are housed in between the upper cover and the lower cover,
wherein a specific gravity of the case body and the electrical unit is 1 or less as a whole.

12. The portable electronic key according to claim 11, wherein the case body is formed of foam resin.

13. The portable electronic key according to claim 12, wherein an air chamber is provided in the inside of the case body.

14. The portable electronic key according to claim 12, wherein a float body is filled in the inside of the case body.

15. The portable electronic key according to claim 11, wherein an air chamber is provided in the inside of the case body.

16. The portable electronic key according to claim 11, wherein a float body is filled in the inside of the case body.

17. The portable electronic key according to claim 11, wherein the portable electronic key is used in a ship.

18. The portable electronic key according to claim 11, further comprising recessed portions on the lower cover of the case body.

19. The portable electronic key according to claim 18, further comprising a pressed part on the upper cover of the case body, opposite the recessed portions.

20. The portable electronic key according to claim 11, further comprising a through hole penetrating through the lower cover and the upper cover of the case body.

* * * * *